(12) United States Patent
Vanneman

(10) Patent No.: US 7,448,138 B1
(45) Date of Patent: Nov. 11, 2008

(54) LASER DETECTOR AND GRADE ROD COUPLING DEVICE

(75) Inventor: Robert W. Vanneman, Bend, OR (US)

(73) Assignee: Laserline Mfg. Inc., Redmond, OR (US)

( * ) Notice: Subject to any disclaimer, the term of this patent is extended or adjusted under 35 U.S.C. 154(b) by 7 days.

(21) Appl. No.: 11/733,034

(22) Filed: Apr. 9, 2007

(51) Int. Cl.
*G01C 5/00* (2006.01)
*G01C 15/06* (2006.01)

(52) U.S. Cl. .......................................... 33/290; 33/293

(58) Field of Classification Search ........... 33/290–296, 33/521, 1 H; 248/218.4, 219.2, 530, 542, 248/904
See application file for complete search history.

(56) References Cited

U.S. PATENT DOCUMENTS

| | | | | |
|---|---|---|---|---|
| 4,029,415 A | * | 6/1977 | Johnson | 33/294 |
| 4,471,532 A | * | 9/1984 | Francis | 33/296 |
| 4,490,919 A | * | 1/1985 | Feist et al. | 33/290 |
| 5,189,484 A | * | 2/1993 | Koschmann et al. | 33/293 |
| 6,166,802 A | * | 12/2000 | Kodaira et al. | 356/4.08 |
| 6,389,709 B1 | * | 5/2002 | Lunde | 33/292 |
| 7,207,118 B2 | * | 4/2007 | Watters et al. | 33/290 |
| 7,373,725 B1 | * | 5/2008 | Vanneman et al. | 33/293 |
| 2002/0083606 A1 | * | 7/2002 | Monteil et al. | 33/521 |
| 2002/0162233 A1 | * | 11/2002 | El-Katcha et al. | 33/293 |

* cited by examiner

*Primary Examiner*—G. Bradley Bennett
(74) *Attorney, Agent, or Firm*—Theodore W. Baker

(57) ABSTRACT

A laser detector and grade rod coupling device is disclosed. The laser detector and grade rod coupling device can be compatible with laser detectors having different sizes, different shapes, and/or different relative positions of their laser targets. The laser detector and grade rod coupling device can include a height-adjustable bracket, a backing, and a flexible strap. The size of a laser detector opening between the backing and the flexible strap can be adjustable. A method for attaching a laser detector to a grade rod also is disclosed. This method can include positioning a laser detector against a bracket of a laser detector and grade rod coupling device and adjusting the height of the bracket until a laser level marking on the laser detector is aligned with a grade rod measurement indicator on the laser detector and grade rod coupling device.

24 Claims, 4 Drawing Sheets

LASER DETECTOR AND GRADE ROD COUPLING DEVICE

FIELD

This disclosure concerns devices that physically couple laser detectors to grade rods.

BACKGROUND

On construction job sites, there typically is a need to readily determine true elevations and/or relative elevations at specific locations. For example, it often is necessary to determine how much material should be added or removed at specific locations to create a level surface for a building foundation. Conventionally, an optical instrument (e.g., a level, a transit, or a theodolite) and a grade rod are used in conjunction to generate these measurements. On most modern construction job sites, the optical instrument is a laser that projects a level laser beam. The laser is placed at a fixed location and the grade rod is moved throughout the job site to take height measurements at specific locations.

Most conventional grade rods are elongated poles with fixed height markings in metric and/or English units. For example, such grade rods can include a scale from zero feet (at the base) to six feet (near the top), with markings for hundredths of a foot (or markings for inches and fractions of inches) between the markings for feet. The laser beam can be either visibly projected onto the grade rod or received by a laser detector mounted on the grade rod. The markings on the grade rod at the point onto which the laser beam is projected indicate the distance between the ground (or other object) at the measurement location and the elevation of the laser. For example, if the laser is at a known elevation of 255 feet above sea level and the laser beam is detected at a height of 5 feet on the grade rod, the elevation at the measurement location is 255−5=250 feet above sea level.

Using grade rods with fixed height markings to gather true elevation measurements requires field calculations. Specifically, it is necessary to subtract the measurement at the point onto which the laser beam is projected from the known elevation of the laser. Once the true elevation at the measurement location has been determined, it often is necessary to subtract this value from a target value to determine how much material should be added (i.e., filled) or removed (i.e., cut) at the measurement location. For example, if the true elevation at the measurement location is 250 feet above sea level and the target for the measurement location is 253 feet above sea level, 253−250=3, so 3 feet of material should be added. If the result of this calculation is negative, it indicates the amount of material that should be removed from the measurement location. When dozens of measurements must be taken and the measurements include inches and fractions of inches, these field calculations can become burdensome and complex, which can lead to costly errors.

Grade rods with adjustable displays (some varieties of which are referred to as "direct reading" grade rods) were developed to reduce the need for field calculations. Such grade rods are described, for example, in U.S. Pat. No. 4,471,532. These grade rods typically include a measurement tape that can be adjusted so that the positions of the measurement markings move relative to the overall grade rod. For example, the measurement tape can encircle a portion of the grade rod and be rotatable around that portion of the grade rod. This allows the portion of the measurement tape within a display region on one side of the grade rod to be shifted. To determine true elevations, the grade rod can be placed on a location with a known elevation. A laser detector mounted on the grade rod then can be moved up or down until it detects a projected laser beam. Next, the measurement tape can be moved so that the measurement adjacent to a measurement indicator coupled to the laser detector corresponds to the last whole foot digit, inches, and fractions of inches of the known elevation. For example, if the known elevation is 255 feet 4¼ inches above seal level, the measurement tape can be shifted so that the measurement adjacent to the measurement indicator is 5 feet 4¼ inches. Once the position of the measurement tape has been set and locked in place, the overall grade rod can be moved to different locations. At each location, the laser detector can be moved up or down until it detects the projected laser beam. The measurement adjacent to the measurement indicator then indicates the last whole foot digit, inches, and fractions of inches of the true elevation at the measurement location. The remaining digits can be committed to memory or written in a convenient location.

Grade rods with adjustable displays also can be used to conveniently determine how much material should be added or removed at a measurement location. The procedure is similar to the procedure described above. At a reference location (e.g., the planned finish grade for a job site), the measurement tape can be adjusted until a zero marking on a cut/fill scale is aligned with the measurement indicator coupled to the laser detector. The cut/fill scale can include measurements extending above and below the zero marking. The grade rod then can be moved to different locations. At each location, the laser detector can be moved up or down until it detects the projected laser beam. If, at a measurement location, the measurement indicator is above the zero marking, the measurement adjacent to the measurement indicator indicates the amount of fill necessary to bring the grade at the measurement location up to the reference grade. Similarly, if the measurement indicator is below the zero marking, the measurement adjacent to the measurement indicator indicates the amount of cut necessary to bring the grade at the measurement location down to the reference grade.

SUMMARY

Disclosed herein are embodiments of a laser detector and grade rod coupling device. Some embodiments of the disclosed laser detector and grade rod coupling device are compatible with laser detectors having different sizes, different shapes, and/or different relative positions of their laser targets. Moreover, some embodiments of the disclosed laser detector and grade rod coupling device allow this wide variety of laser detectors to be used with non-standard grade rods, such as grade rods with adjustable measurement displays.

Some embodiments of the disclosed laser detector and grade rod coupling device include a height-adjustable bracket, a backing, and a flexible strap. The backing can have a major surface substantially perpendicular to a major surface of the height-adjustable bracket. Embodiments of the disclosed laser detector and grade rod coupling device also can include a grade rod coupling rail. The grade rod coupling rail can have an inside major surface that is substantially perpendicular to an inside major surface of the backing. A laterally extending grade rod measurement indicator can be included adjacent to the grade rod coupling rail or on another portion of the laser detector and grade rod coupling device.

Some embodiments of the disclosed laser detector and grade rod coupling device include both a lower height-adjustable bracket and an upper height-adjustable bracket. A laser detector can be firmly held between these brackets. The flexible strap also can help to hold a laser detector in place. The size of a laser detector opening between the backing and the flexible strap can be adjustable. The vertical position of the flexible strap also can be adjustable.

Embodiments of the disclosed laser detector and grade rod coupling device can include a first vertical slot and a second vertical slot. The flexible strap can include a stopper preventing movement of the flexible strap through the first vertical slot. In addition, the flexible strap can be reversibly attachable to itself to form a nonpermanent loop extending through the second vertical slot. The flexible strap can be vertically slideable within the first vertical slot and the second vertical slot. In some disclosed embodiments, the flexible strap includes a hook-and-loop fastener. For example, the flexible strap can include a hook-fastening surface and a corresponding loop-fastening surface on two portion of the same side of the flexible strap.

Also disclosed are embodiments of a surveying apparatus. These embodiments can include an embodiment of the disclosed laser detector and grade rod coupling device and a grade rod, such as a grade rod with an adjustable measurement display. The laser detector and grade rod coupling device can be connected to the grade rod such that the laser detector and grade rod coupling device is vertically movable along the height of the grade rod in an unlocked condition and fixed relative to the height of the grade rod in a locked condition. Embodiments of the disclosed surveying apparatus also can include a laser detector firmly held between a backing and a flexible strap of the laser detector and grade rod coupling device.

Also disclosed are embodiments of a method for attaching a laser detector to a grade rod. These embodiments can include positioning a laser detector against a bracket of a laser detector and grade rod coupling device and adjusting the height of the bracket until a laser level marking on the laser detector is aligned with a grade rod measurement indicator on the laser detector and grade rod coupling device. Embodiments of the disclosed method also can include locking the height of the bracket after adjusting the height of the bracket. Some of these embodiments include adjusting the height of both a lower bracket and an upper bracket until the laser detector is firmly held between the lower bracket and the upper bracket. These and other embodiments can include tightening a flexible strap around the laser detector and/or adjusting the vertical position of the flexible strap relative to the laser detector and grade rod coupling device.

DETAILED DESCRIPTION

Figure 1:
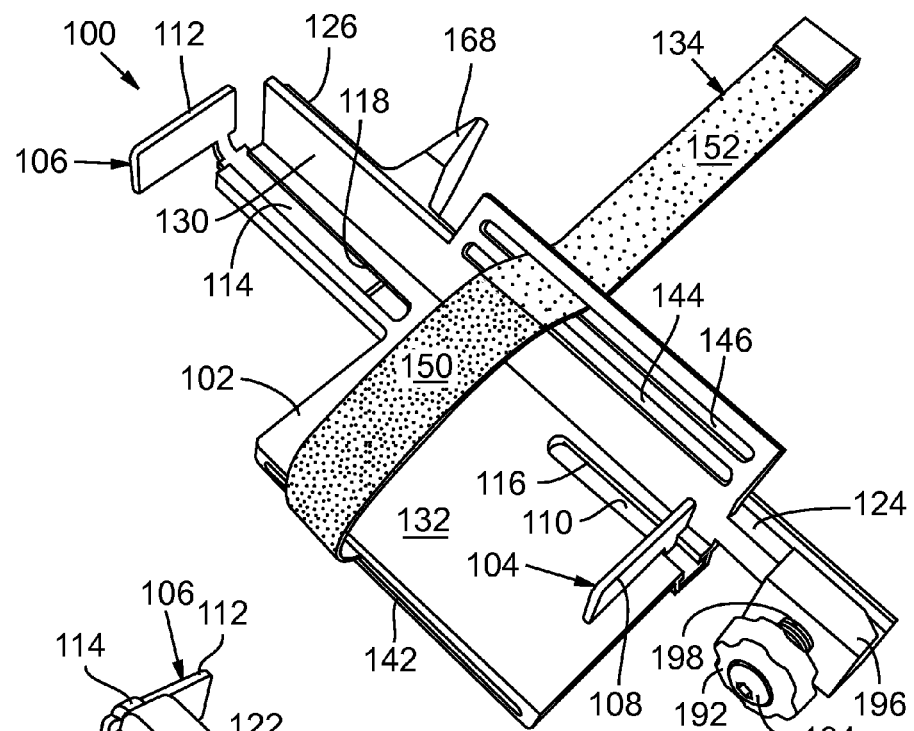
FIG. 1 is a perspective view of a front side of one embodiment of the disclosed laser detector and grade rod coupling device.
Figure 2:
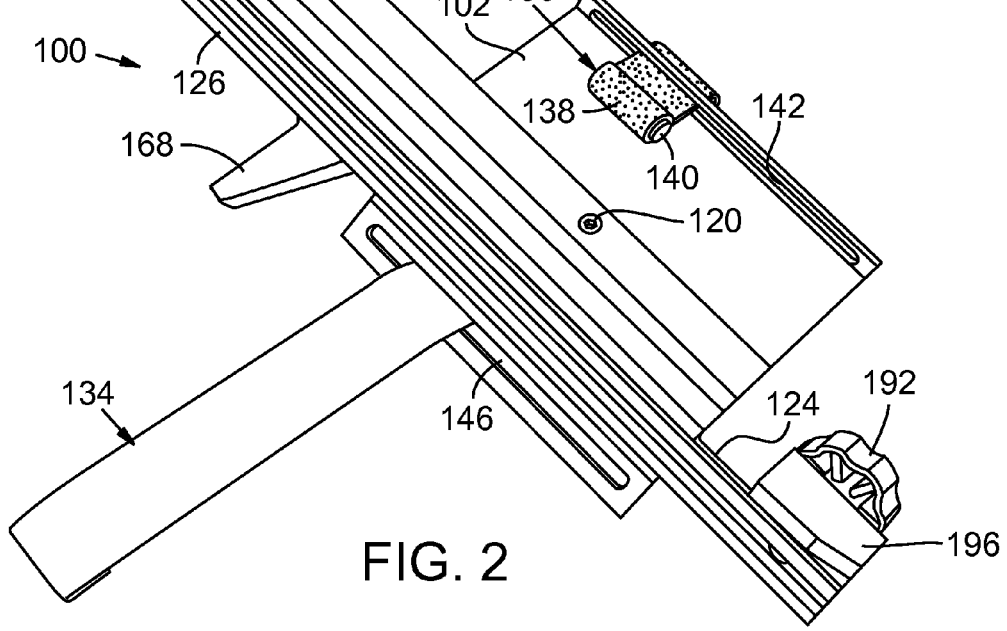
FIG. 2 is a perspective view of a back side of the embodiment shown in FIG. 1.

Throughout this disclosure, the singular terms "a," "an," and "the" include plural referents unless the context clearly indicates otherwise. Similarly, the word "or" is intended to include "and" unless the context clearly indicates otherwise. As used herein the term "bracket" refers to any substantially lateral projection attached to a support. Directional terms, such as "upper," "lower," "front," "back," "vertical," and "horizontal," are used herein to express and clarify the relationship between various elements. It should be understood that such terms do not denote absolute orientation (e.g., a "vertical" component can become horizontal by rotating the device).

Described herein are embodiments of a laser detector and grade rod coupling device, embodiments of a surveying apparatus including a laser detector and grade rod coupling device, and embodiments of a method for attaching a laser detector to a grade rod. The laser detectors used with grade rods typically include electronics that pinpoint the height of a reference laser beam. In operation, the laser detector and the laser detector and grade rod coupling device are moved up or down along the height of the grade rod until the laser detector signals that the laser beam is in close proximity. The height of the laser detector and the laser detector and grade rod coupling device then can be fine-tuned using an audio signal (e.g., beeping) or a visual display (e.g., up and down arrows). When the laser beam is received on target, the laser detector and grade rod coupling device can be secured to the grade rod. In this final position, a measurement indicator on the laser detector and grade rod coupling device indicates the position of the laser beam on the grade rod's measurement scale.

There are numerous manufacturers of laser detectors and many more individual laser detector models. The laser detector models on the market typically have different shapes and sizes as well as different relative positions of their laser targets. Therefore, a laser detector and grade rod coupling device designed for use with one model of laser detector most often will not work with a different model of laser detector. Most laser detectors are sold with a laser detector and grade rod coupling device designed to couple the particular laser detector with a standard grade rod having fixed height markings. Standard grade rods typically include no laterally extending projections and have a uniform, rectangular cross sectional shape along their entire height. In contrast, non-standard grade rods often do include laterally extending projections and/or do not have a uniform, rectangular cross sectional shape along their entire height. For example, some grade rods with adjustable displays include one or more laterally extending knobs, such as knobs used to tighten a clamp on the measurement tape so that it does not shift after the grade rod has been calibrated. In addition, in some grade rods with adjustable displays, the adjustable display is positioned within a first shaft that is raised above the ground and connected to a second shaft that extends the remainder of the distance to the ground. The cross sectional shape of these grade rods changes along their height where the separate shafts do and do not overlap. Moreover, a laterally extending knob typically is included to lock the two shafts together after adjustment of one shaft relative to the other.

Laser detector and grade rod coupling devices designed for use with standard grade rods typically are incompatible with some or all non-standard grade rods. For example, many conventional laser detector and grade rod coupling devices hold a grade rod between two brackets or within a frame defining an opening shaped to fit around a grade rod's cross section. As one of these laser detector and grade rod coupling devices is moved up and/or down along the height of a grade rod during operation, any lateral projections on the grade rod (e.g., the knobs discussed above) can block movement of the laser detector and grade rod coupling device's bracket or frame. Similarly, the bracket or frame of these laser detector and grade rod coupling devices can slip or be blocked if the cross sectional shape of the grade rod varies along its height (e.g., with the overlapping shafts discussed above). As a result of the incompatibility between original-equipment-manufacturer (OEM) laser detector and grade rod coupling devices and non-standard grade rods, after-market laser detector and grade rod coupling devices have been developed. After-market laser detector and grade rod coupling devices can be used to couple laser detectors to non-standard grade rods. After-market laser detector and grade rod coupling devices also can be used to couple laser detectors to standard grade rods. This can be useful, for example, if the OEM laser detector and grade rod coupling device sold with a laser detector has been lost.

Certain design constraints have prevented conventional after-market laser detector and grade rod coupling devices from being compatible with any more than limited number of laser detector models. First, there is a need for after-market laser detector and grade rod coupling devices to hold the laser detector relatively firmly. Otherwise, standard handling in the field could move the laser detector and cause inaccurate measurements. Second, there is a need for after-market laser detector and grade rod coupling devices to hold the laser detector so that a laser target on the laser detector is at the same level as a measurement indicator on the laser detector and grade rod coupling device. This ensures that the level of the detected laser beam is accurately translated onto the grade rod's measurement scale. To achieve these objectives, conventional after-market laser detector and grade rod coupling devices typically include a rigidly defined opening shaped to snugly fit a particular laser detector model having a certain size and shape. The measurement indicators on these conventional after-market laser detector and grade rod coupling devices are fixed relative to the openings so as to align with the position of the laser target of the particular laser detector model. The vase number of different sizes and shapes of laser detectors on the market has necessitated the manufacture of many varieties of after-market laser detector and grade rod coupling devices, each variety being designed for use with particular laser detector models. Manufacturing many different laser detector and grade rod coupling devices is costly. Furthermore, there can be a delay between the launch of a new laser detector model and the availability of a compatible laser detector and grade rod coupling device.

Some embodiments of the disclosed laser detector and grade rod coupling device are compatible with laser detectors having different sizes, different shapes, and/or different relative positions of their laser targets. FIGS. 1-5 illustrate one such embodiment. The illustrated laser detector and grade rod coupling device 100 includes a backing 102, a lower bracket 104, and an upper bracket 106. To accommodate laser detectors of different heights and to allow the laser detectors to be vertically positioned relative to other elements of the laser detector and grade rod coupling device 100, the lower bracket 104 and the upper bracket 106 are adjustable. As shown in the exploded view of FIG. 4, the lower bracket 104 includes a support plate 108 and an upwardly projecting key 110. Similarly, the upper bracket 106 includes a support plate 112 and a downwardly projecting key 114. The upwardly projecting key 110 of the lower bracket 104 and the downwardly projecting key 114 of the upper bracket 106 slide into a lower key channel 116 and an upper key channel 118, respectively. Tightening a lower key channel screw 120 frictionally secures the upwardly projecting key 110 within the lower key channel 116. Tightening an upper key channel screw 122 frictionally secures the downwardly projecting key 114 within the upper key channel 118. In this way, the vertical position of the lower bracket 104 and the upper bracket 106 can be secured after adjustment.

The illustrated laser detector and grade rod coupling device 100 also includes a coupling rail 124 with a first flange 126 and a second flange 128. The coupling rail 124 has an inside major surface 130 that is substantially perpendicular to an inside major surface 132 of the backing 102. A flexible strap 134 is configured to hold a laser detector against the inside major surface 130 of the coupling rail 124 and the inside major surface 132 of the backing 102. The flexible strap 134 can conform to differences in the sizes and shapes of different types of laser detectors. When tightened, the flexible strap 134 facilitates the firm containment of these different types of laser detectors within the laser detector and grade rod coupling device 100. The flexible strap 134 has a stopper 136 at one end to secure that end during tightening. In the illustrated laser detector and grade rod coupling device 100, the stopper 136 includes a permanent loop 138 around a cylindrical peg 140. The stopper 136 prevents movement of one end of the flexible strap 134 through a first vertical slot 142 adjacent to the backing 102. In other embodiments, the stopper 136 can be a permanent loop around a fixed portion of the laser detector and grade rod coupling device 100, such as a permanent loop through the first vertical slot 142.

Figure 3:
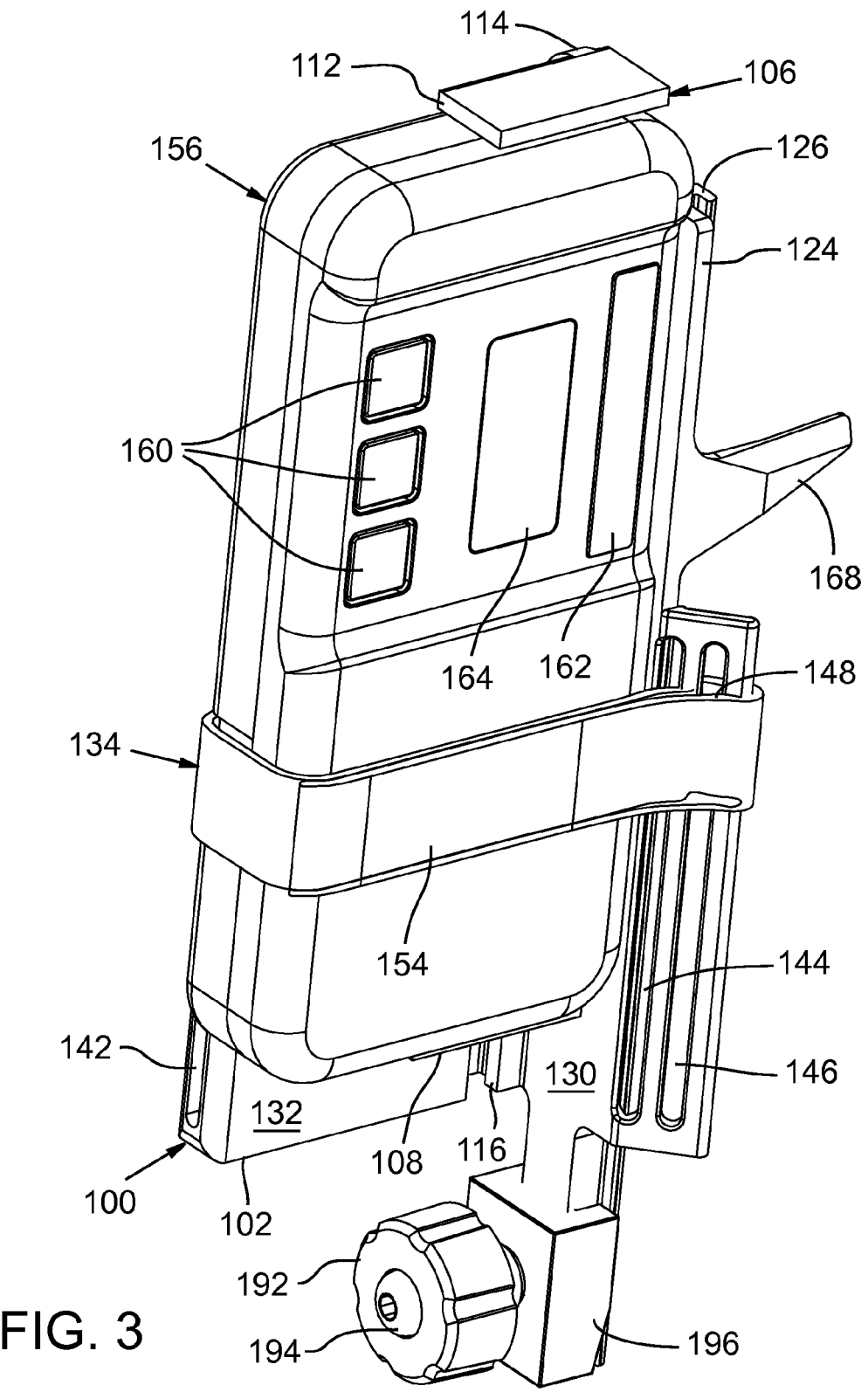
FIG. 3 is a perspective view of the embodiment shown in FIG. 1 holding a laser detector.
Figure 4:
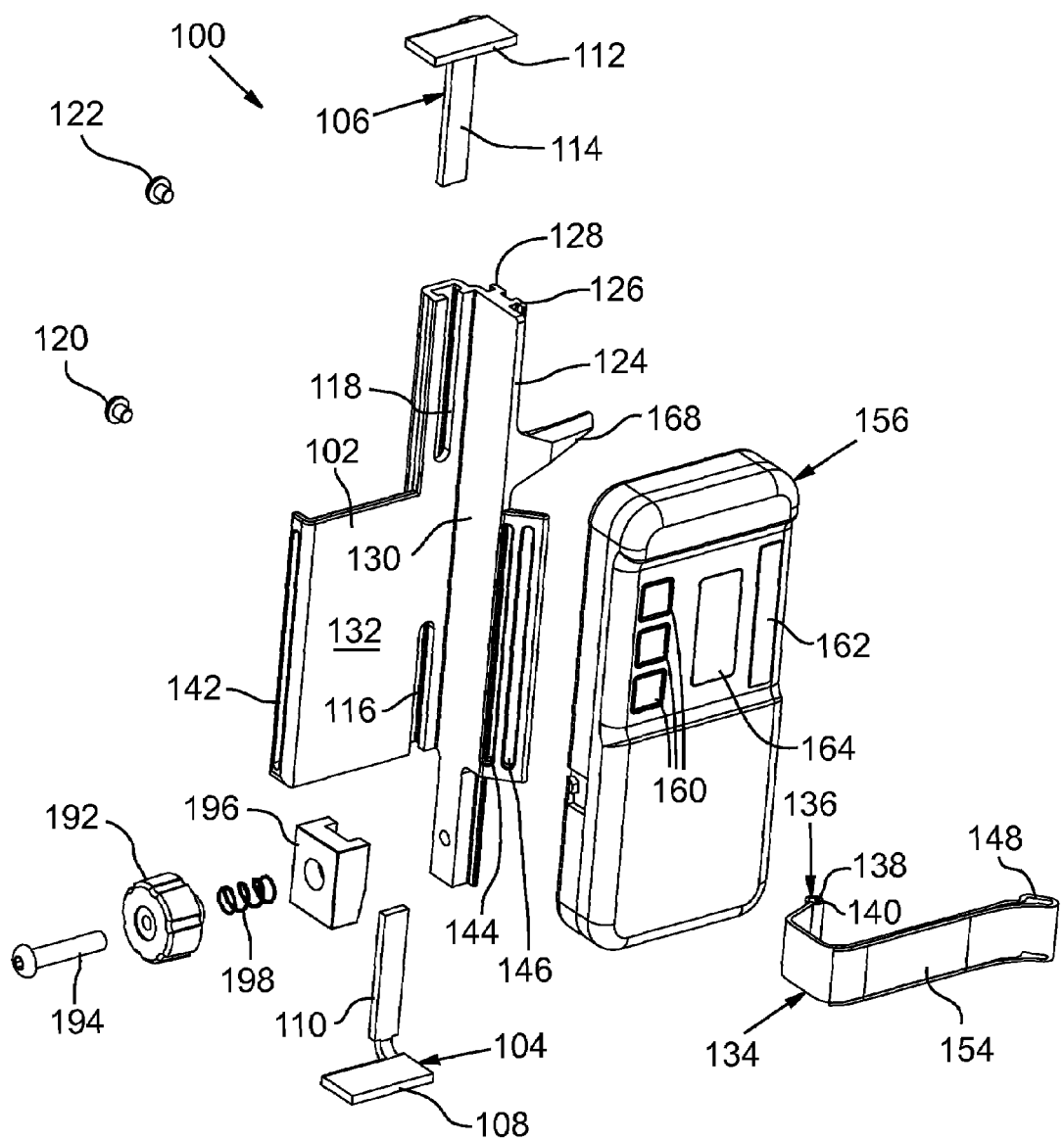
FIG. 4 is an exploded perspective view of the embodiment shown in FIG. 1 holding a laser detector.
Figure 5:
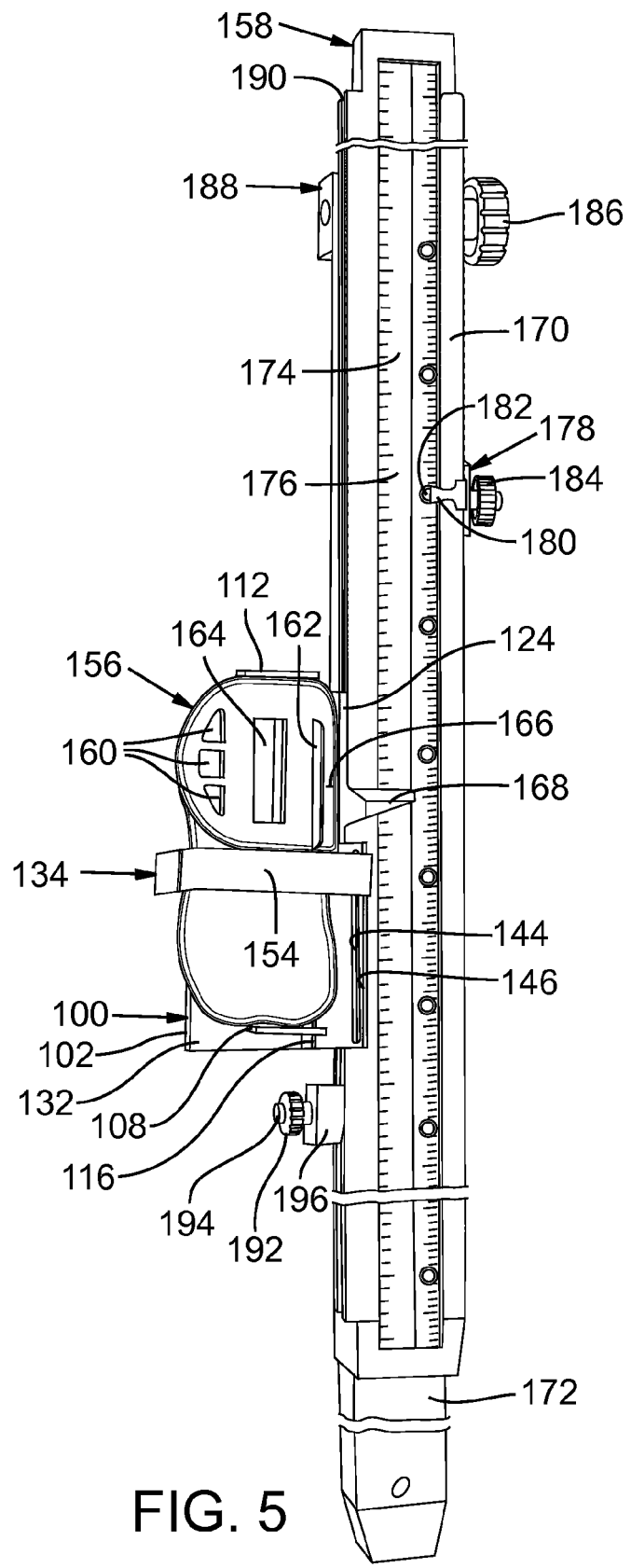
FIG. 5 is a perspective view of the embodiment shown in FIG. 1 holding a laser detector and attached to a grade rod.

The end of the flexible strap 134 opposite to the end having the stopper 136 can be threaded through a second vertical slot 144 and/or through a third vertical slot 146. The second vertical slot 144 and the third vertical slot 146 are positioned adjacent to the coupling rail 124. By pulling the flexible strap 134 through the second vertical slot 144 and/or the third vertical slot 146, it is possible to tighten the flexible strap around a laser detector. Friction between the flexible strap 134 and the edges of the second vertical slot 144 and/or the third vertical slot 146 can prevent the flexible strap from becoming untightened without user intervention. In addition, the flexible strap 134 can be fastened to itself to form a nonpermanent loop 148 extending through the second vertical slot 144 and/or the third vertical slot 146. In the illustrated embodiment, the flexible strap 134 includes a hook-fastening surface 150 and a loop-fastening surface 152 both positioned on the outside surface of the flexible strap. When the flexible strap 134 is threaded through the second vertical slot 144 and/or the third vertical slot 146 and then overlapped, the hook-fastening surface 150 and the loop-fastening surface 152 oppose one another. As shown in FIGS. 3-5, the hook-fastening surface and the loop-fastening surface meet at a flexible strap self-attachment region 154.

The first, second, and third vertical slots 142, 144, 146 have heights greater than the height of the flexible strap 134. In addition, the flexible strap 134 is vertically slideable within the first, second, and third vertical slots 142, 144, 146. Thus, the vertical position of the flexible strap 134 can be adjusted to accommodate the shapes of different types of laser detectors. For example, it can be useful to adjust the vertical position of the flexible strap 134 if it would otherwise block displays or controls on the laser detector.

FIG. 5 shows the laser detector and grade rod coupling device 100 holding a laser detector 156 and attached to a grade rod 158. The laser detector 156 includes a set of controls 160, a laser beam receiving field 162, a laser beam position indicator display 164, and a laser level marking 166. In operation, the laser detector 156 receives a laser beam some wherein the laser beam receiving field 162 and indicates a relative position of the laser beam on the laser beam position indicator display 164. Using the laser beam position indicator display 164 as a guide, the height of the laser detector 156 can be adjusted until the laser beam is received at substantially the same height as the laser level marking 166. Thus, once the laser detector 156 is properly positioned, the laser level marking 166 corresponds to the height of the laser beam.

To position the laser detector 156 within the laser detector and grade rod coupling device 100, the lower bracket 104 can be adjusted so that it supports the laser detector at a height at which the laser level marking 166 of the laser detector is aligned with a measurement indicator 168 of the laser detector and grade rod coupling device. The adjustable height of the lower bracket 104 allows the laser detector and grade rod coupling device 100 to accommodate laser detector models having different relative positions of their laser level markings 166. Once the lower bracket 104 has been positioned, the upper bracket 106 can be tightened against the end of the laser detector 156 opposite to the end resting on the lower bracket. Next, the flexible strap 134 of the laser detector and grade rod coupling device 100 can be pulled through the second vertical slot 144 and/or the third vertical slot 146 until it is tight around the laser detector 156. The flexible strap 134 then can be folded back onto itself to form the nonpermanent loop 148. Interaction between the hook-fastening surface 150 and the loop-fastening surface 152 at the flexible strap self-attachment region 154 helps to keep the nonpermanent loop 148 intact. The vertical position of the flexible strap 134 can be adjusted within the first, second, and/or third vertical slots 142, 144, 146 as necessary to prevent the flexible strap from interfering with the controls 160, the laser beam receiving field 162, and the laser beam position indicator display 164 of the laser detector 156.

The grade rod illustrated in FIG. 5 in an adjustable display grade rod. The grade rod 158 includes a first shaft 170 and a second shaft 172. The first shaft 170 includes a display region 174 showing a portion of a measurement tape 176. The measurement tape 176 extends around the entire first shaft 170 and is rotatable around the first shaft to change the visible portion in the display region 174. As discussed in greater detail above, during calibration of the grade rod 158, the measurement tape 176 is shifted relative to the measurement indicator 168 of the attached laser detector and grade rod coupling device 100. In addition, the first shaft 170 can be shifted relative to the second shaft 172. Once the measurement tape 176 has been positioned, it can be locked in place with a measurement tape clamp 178. The measurement tape clamp 178 can be moved vertically along a small portion of the grade rod 158 until a pin 180 on the measurement tape clamp aligns with a grommet 182 on the measurement tape 176. A measurement tape clamp knob 184 then can be tightened to press the pin 180 into the grommet 182 and thereby prevent movement of the measurement tape 176. Similarly, a shaft clamp knob 186 can be used to tighten a shaft clamp 188 around the first shaft 170 and the second shaft 172 to lock the position of the first shaft relative to the second shaft.

The first and second flanges 126, 128 of the coupling rail 124 of the laser detector and grade rod coupling device 100 fit into a receiving rail 190 on the grade rod 158 to attach the laser detector and grade rod coupling device to the grade rod. When taking a measurement, the laser detector and grade rod coupling device 100 can slide vertically relative to the grade rod 158. Once properly positioned (i.e., when the laser detector 156 receives the laser beam at the laser level marking 166), a laser detector and grade rod coupling device clamp knob 192 can be tightened along an alignment bolt 194 to press a locking block 196 against the receiving rail 190. This locks the vertical position of the laser detector and grade rod coupling device 100 relative to the grade rod 158. When not locked, a spring 198 retractably holds the locking block 196 against the receiving rail 190.

Since the laser detector and grade rod coupling device 100 only attaches to the grade rod 158 along one side of the grade rod, there is no interference between the laser detector and grade rod coupling device and the measurement tape clamp knob 184 or the shaft clamp knob 186, which extend from the opposite side of the grade rod. In addition, the receiving rail 190 only extends along the first shaft 170, so there is no interference between the laser detector and grade rod coupling device 100 and the second shaft 172.

Embodiments of the disclosed laser detector and grade rod coupling device can include a variety of different materials. The illustrated laser detector and grade rod coupling device 100 is primarily made of metal. Other embodiments can be primarily made of, for example, plastic, wood, graphite, or composites. The flexible strap 134 in the illustrated laser detector and grade rod coupling device 100 is made of nylon. In other embodiments, the flexible strap can be made of, for example, polyester, polypropylene, metal (e.g., metal chain), rubber, or natural cloth (e.g., cotton). The flexible strap 134 can have a flat cross sectional shape, a round cross sectional shape, or some other cross sectional shape. In the illustrated laser detector and grade rod coupling device 100, the flexible strap 134 includes hook-and-loop surfaces that allow it to attach to itself. In other embodiments, the flexible strap 134 can be fixable in a tightened position by another mechanism, such as tying. Still other embodiments include an element that can be tightened against a face of the laser detector 156, but is not a flexible strap. For example, some embodiments include a clamp, a bracket, or a cross beam that extends across the face of the laser detector 156 and can be tightened against the laser detector by mechanical action, such as by turning a screw. Other embodiments of the disclosed laser detector and grade rod coupling device include a cam that can be tightened against the laser detector to hold the laser detector in place. For example, the cam can be positioned such that tightening the cam presses the laser detector into the corner between the inside major surface 132 of the backing 102 and the inside major surface 130 of the coupling rail 124.

The illustrated laser detector and grade rod coupling device 100 includes both a lower bracket 104 and an upper bracket 106. The lower bracket 104 serves primarily to vertically support the laser detector 156. The upper bracket 106 serves primarily to prevent the laser detector 156 from being displaced due to rough handling. Some embodiments of the disclosed laser detector and grade rod coupling device 100 do not include an upper bracket 106. In these embodiments, other portions of the laser detector and grade rod coupling device 100 serve to prevent the laser detector 156 from being displaced due to rough handling.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A laser detector and grade rod coupling device, comprising:
 a height-adjustable bracket;
 a backing; and
 a flexible strap, wherein the size of a laser detector opening between the backing and the flexible strap is adjustable.

2. The laser detector and grade rod coupling device according to claim 1, wherein the height-adjustable bracket is a lower height-adjustable bracket and the laser detector and grade rod coupling device further comprises an upper height-adjustable bracket.

3. The laser detector and grade rod coupling device according to claim 1, wherein the backing has a major surface substantially perpendicular to a major surface of the height-adjustable bracket.

4. The laser detector and grade rod coupling device according to claim 1, further comprising a laterally extending grade rod measurement indicator.

5. The laser detector and grade rod coupling device according to claim 1, wherein the vertical position of the flexible strap is adjustable.

6. The laser detector and grade rod coupling device according to claim 1, wherein the flexible strap includes a hook-and-loop fastener.

7. The laser detector and grade rod coupling device according to claim 1, wherein the flexible strap includes a hook-fastening surface on a first portion and a corresponding loop-fastening surface on a second portion, and the first and second portions are on the same side of the flexible strap.

8. The laser detector and grade rod coupling device according to claim 1, further comprising a first vertical slot and a second vertical slot, wherein the flexible strap includes a stopper preventing movement of the flexible strap through the first vertical slot, and the flexible strap is reversibly attachable to itself to form a nonpermanent loop extending through the second vertical slot.

9. The laser detector and grade rod coupling device according to claim 8, wherein the flexible strap is vertically slideable within the first vertical slot and the second vertical slot.

10. The laser detector and grade rod coupling device according to claim 1, further comprising a grade rod coupling rail.

11. The laser detector and grade rod coupling device according to claim 10, wherein the grade rod coupling rail has an inside major surface that is substantially perpendicular to an inside major surface of the backing.

12. A laser detector and grade rod coupling device, comprising:
   a grade rod measurement indicator;
   support means for rigidly supporting a laser detector; and
   height-adjustment means for adjusting a height of the laser detector relative to the grade rod measurement indicator.

13. The laser detector and grade rod coupling device according to claim 12, further comprising locking means for firmly holding the laser detector against the support means.

14. A surveying apparatus, comprising:
   a grade rod; and
   a laser detector and grade rod coupling device connected to the grade rod such that the laser detector and grade rod coupling device is vertically movable along the height of the grade rod in an unlocked condition and fixed relative to the height of the grade rod in a locked condition, wherein the laser detector and grade rod coupling device includes a height-adjustable bracket.

15. The surveying apparatus according to claim 14, wherein the laser detector and grade rod coupling device further includes a measurement indicator extending across a measurement display of the grade rod.

16. The surveying apparatus according to claim 14, wherein the grade rod has an adjustable measurement display.

17. The surveying apparatus according to claim 14, wherein the laser detector and grade rod coupling device further includes a flexible strap.

18. The surveying apparatus according to claim 17, further comprising a laser detector, wherein the laser detector and grade rod coupling device further includes a backing, and the flexible strap firmly holds the laser detector against the backing.

19. The surveying apparatus according to claim 18, wherein the height-adjustable bracket is a lower height-adjustable bracket, the laser detector and grade rod coupling device further includes an upper height-adjustable bracket, and the laser detector is firmly held between the lower height-adjustable bracket and the upper height-adjustable bracket.

20. A method for attaching a laser detector to a grade rod, comprising:
   positioning a laser detector against a bracket of a laser detector and grade rod coupling device;
   adjusting the height of the bracket until a laser level marking on the laser detector is aligned with a grade rod measurement indicator on the laser detector and grade rod coupling device; and
   locking the height of the bracket after adjusting the height of the bracket until the laser level marking on the laser detector is aligned with the grade rod measurement indicator on the laser detector and grade rod coupling device.

21. The method according to claim 20, wherein the bracket is a lower bracket and the method further comprises adjusting the height of an upper bracket until the laser detector is firmly held between the lower bracket and the upper bracket.

22. The method according to claim 20, wherein the grade rod has an adjustable display.

23. The method according to claim 20, further comprising tightening a flexible strap around the laser detector.

24. The method according to claim 23, further comprising adjusting the vertical position of the flexible strap relative to the laser detector and grade rod coupling device.

* * * * *